United States Patent [19]
Deletzke, Jr.

[11] 3,967,789
[45] July 6, 1976

[54] TAPE WINDING SYSTEM

[76] Inventor: Norman E. H. Deletzke, Jr., P.O. Box 221, Wilmette, Ill. 60091

[22] Filed: Oct. 2, 1974

[21] Appl. No.: 511,200

[52] U.S. Cl. .......................... 242/56 R; 242/67.3 R
[51] Int. Cl.² ...................................... B65H 19/20
[58] Field of Search ..................... 242/56 R, 67.3 R; 156/502, 504, 506

[56] References Cited
UNITED STATES PATENTS

| | | | |
|---|---|---|---|
| 3,276,708 | 10/1966 | Yefsky | 242/67.3 RX |
| 3,309,037 | 3/1967 | Amos | 242/67.3 R |
| 3,495,782 | 2/1970 | Nelson | 242/56 R |
| 3,637,154 | 1/1972 | Northup | 242/56 R |
| 3,717,314 | 2/1973 | King | 242/56 R |

*Primary Examiner*—Edward J. McCarthy
*Attorney, Agent, or Firm*—Jerold A. Jacover

[57] ABSTRACT

In a tape winding system having supply means driven by supply driving means, and takeup means driven by takeup driving means, a method for winding a quantity of tape from the supply means to the takeup means is disclosed. The method comprises the steps of forwardly energizing the supply driving means and the takeup driving means, causing tape to unwind from the supply means and wind onto the takeup means with minimal tension on the tape; then reducing the energization of the supply driving means, causing the tape to be pulled from the supply means onto the takeup means; and then stopping the supply means and the takeup means. The apparatus for accomplishing these steps, and the resulting product are also disclosed.

15 Claims, 5 Drawing Figures

TAPE WINDING SYSTEM

BACKGROUND OF THE INVENTION

This invention relates to an apparatus and method for winding a ribbon of reproducibly stored information such as magnetic tape of the type used in recording and playback machines. The winding system of the invention finds particular application in the manufacture of continuous loop cartridges such as 8-track tape cartridges. This invention also relates to the ribbon of reproducibly storable information so wound.

In the tape recording industry, particularly that aspect thereof that produces audio programs for consumer entertainment purposes, three familiar tape formats compete vigorously in the marketplace. These formats include the so-called reel-to-reel format, the cassette, and the 8-track cartridge. The reel-to-reel format utilizes a supply reel, on which a tape containing recorded program material is wound. To hear the program material the tape is conventionally fed past a playback head and collected on a takeup reel. After the program has been completed, the tape is ordinarily rewound onto the supply reel.

The cassette is a miniaturized self-contained reel-to-reel system. Like the reel-to-reel format, the casette has a supply reel and a takeup reel adapted to wind and rewind tape carrying recorded program material. The reels, however, are ordinarily enclosed within a small plastic magazine, which is inserted in a specially adapted machine to achieve the playback or rewind modes.

Unlike the conventional reel-to-reel format or cassette, the continuous loop cartridge utilizes only a single reel for carrying tape on which program material is recorded. The tape is wound about the reel in a continuous loop by extracting one end of the tape from the most interior wind and splicing it to the free, outer end. The continuous reel is then conventionally inserted in a plastic magazine, somewhat larger in size than the cassette. A specially designed cartridge player is adapted to play the recorded material upon insertion of the cartridge.

Though the continuously wound 8-track cartridge has numerous advantages over both the reel-to-reel format and the cassette, particularly the fact that it does not have to be rewound after playback, it also suffers from several drawbacks. Among these drawbacks is the fact that the manufacture of 8-track cartridges requires a relatively large amount of labor per unit and has a relatively high reject ratio. This adds to the cost of the cartridges placed on the market, and as a result, the 8-track cartridge has not realized its maximum competitive potential.

Though manufacturing techniques vary, in general, 8-track cartridges are made by starting with a supply reel of tape having a plurality of identical programs recorded thereon. The tape is placed on a winding apparatus and one end is threaded past a capstan and onto an 8-track platform, referred to hereinafter as a takeup reel. Motors controlling the capstan, the takeup reel, and sometimes the supply reel are then energized, to pull tape from the supply reel to the takeup reel, until the first program is wound onto the takeup reel. After this has been accomplished, the motors are de-energized and the rotation of the reels is stopped.

At a point on the tape far enough beyond the end of the first program to provide sufficient slack, the tape is cut to provide a free outer end which, as explained above, is spliced to the interior end wound on the takeup reel. In order to make this splice, the interior end is pulled up from the center of the tape wound on the takeup reel, and attached to the free outer end by conventional means. The takeup reel, now carrying a continuously wound tape program, is then inserted into an 8-track magazine in a conventional manner.

In many prior art winding systems, the rate at which a program is wound from the supply reel to the takeup reel is relatively slow. As a result, the operator tends to become inattentive. Alternatively, the operator may be required to perform other tasks during the relatively slow winding period, thereby creating an inefficient expenditure of the operator's time and motion.

In addition to operator inefficiency, many winding systems of the prior art undesirably produce a uniformly tight wind on the takeup reel. Thus, in such systems the inner end of the tape can generally be pulled up from the center only with substantial difficulty. Moreover, oftentimes the tape crinkles when it is pulled, necessitating severance and disposal of the crinkled portion. Heretofore, the most common method for eliminating tight center winds on the takeup reel has been to reduce the torque of the takeup motor, thereby achieving a loose wind on the entire takeup reel. This is unacceptable, however, because a uniformly loose wind is generally achieved by entrapping air between the winds, which precludes precise correlation between the number of turns and the length of the tape program necessary to effect proper tensioning inside the completed cartridge. For example, too few turns for a given length of tape will inhibit tape movement inside the cartridge, resulting in sound distortion or jamming. On the other hand, too many turns for a given length of tape will cause tape spillage. Though it would appear that these problems could be circumvented by counting both the length of the program and the number of turns, this is also unacceptable because of the inherent variations in tape thickness. Thus, though a uniformly loose wind may facilitate tape pullout, it creates numerous other problems which themselves result in additional labor and a high reject ratio.

Operator inattentiveness, pullout difficulties, crinkling problems, winding inconsistencies and tape wastage all tend to increase the cost of manufacturing 8-track cartridges. Accordingly, it is the primary object of the invention to provide a tape winding apparatus and method which militate against the causes of these high manufacturing costs. More particularly, it is an object of this invention to provide a high speed tape winding system which requires minimal operator skill. It is also an object of this invention to produce a wound ribbon of reproducibly storable information having relatively loose center winds, thereby reducing pullout difficulties and minimizing tape crinkle and wastage, and tight noncenter winds which result in a more consistently wound product. A further object of the invention is to provide a tape winding system which achieves all of the above benefits without using a costly capstan or capstan motor, though, it will be seen that the invention can be practiced with a capstan and a capstan motor.

SUMMARY OF THE INVENTION

To achieve these and other objects, in a tape winding system having supply means driven by supply driving means, and takeup means driven by takeup driving means, a method for winding a quantity of tape from the supply means to the takeup means is disclosed. The method comprises the steps of forwardly energizing the supply driving means and the takeup driving means, causing tape to unwind from the supply means and wind onto the takeup means with minimal tension on the tape; then reducing the energization of supply driving means causing tape to be pulled from the supply means onto the takeup means; and then stopping the supply means and the takeup means.

The tape winding system for practicing this method comprises takeup means, drivable by takeup drive means, and supply means drivable by supply drive means. The tape winding system further includes mode means having start means for simultaneously coupling electric current from AC means to the supply drive means, and to the takeup drive means. The mode means further has run means for simultaneously reducing the electric current passed to the supply drive means, and increasing the electric current passed to the takeup drive means.

More particularly, the tape winding system of the invention provides means for independently unwinding tape from the supply reel, and independently winding tape onto the takeup reel, at a substantially reduced tension during the initial start mode. This system thus produces minimal tension on the tape as it begins winding onto the takeup reel and therefor provides a loose center for easy pullout. During a run mode, the current energizing the takeup drive means is increased and the current energizing the supply drive means is decreased, enabling the takeup reel to pull tape from a substantially freewheeling supply reel at a faster rate. After the desired program is wound onto the takeup reel, the supply reel and takeup reel are slowed to a stop whereupon the ends of the tape may be spliced together and inserted into a magazine to form a completed 8-track cartridge.

Of course, it is envisioned that the tape from the supply reel can be driven indirectly by a capstan motor as well as being driven directly by a motor coupled to the supply reel. Thus, as used hereinbefore, supply drive means may refer to a capstan motor, or to a motor coupled more directly to the supply reel. When a capstan motor is used, however, another motor coupled to the supply reel can also be used for providing drag thereto.

The invention further includes a wound ribbon of reproducibly storable information, having loose center winds followed by tight noncenter winds.

BRIEF DESCRIPTION OF THE DRAWINGS

A more thorough understanding of the invention can be obtained by reading the following detailed description in conjunction with the accompanying drawings in which.

DETAILED DESCRIPTION OF AN EXEMPLARY EMBODIMENT OF THE INVENTION

Figure 1:
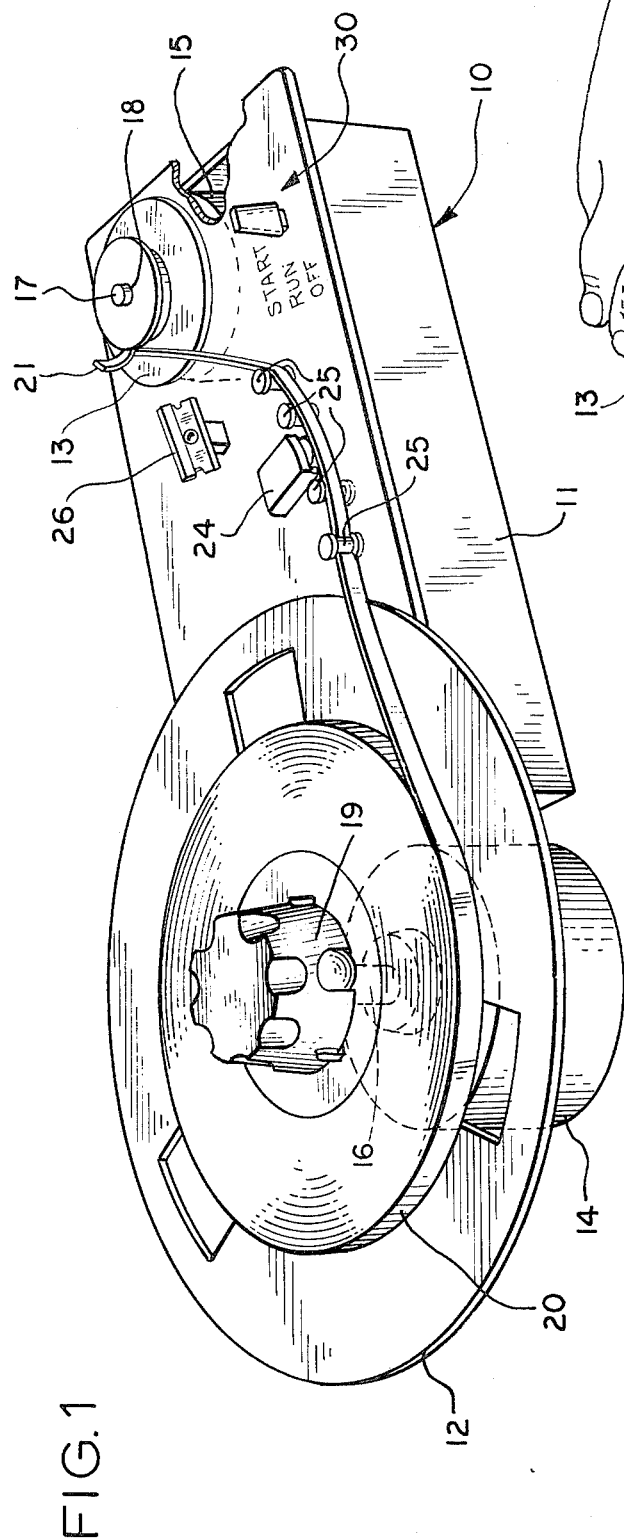
FIG. 1 is a schematic, perspective view, partially cutaway, of the tape winding system of the invention.

Referring now to FIG. 1, a tape winding system is represented generally by reference numeral 10. Tape winding system 10 includes a housing 11 enclosing supply driving means such as a supply motor 14, and takeup driving means such as a takeup motor 15. Supply motor 14 is preferably a high rotor resistance torque-type motor, and takeup motor 15 is preferably a synchronous motor with an accelerating torque curve complementary in function with motor 14. A supply spindle 16 and a takeup spindle 17 are coupled, respectively, to motors 14 and 15, and are adapted to rotate upon the energization thereof.

A supply reel 12, having wound thereon a ribbon of reproducibly storable information such as a quantity of recording tape 20, has conventional center aperture means (not shown) adapted to cooperate with supply spindle 16 to impart the rotational motion thereof to supply reel 12 at a predetermined time. Similarly, an originally empty takeup reel 13 has a center aperture 18 adapted to cooperate with takeup spindle 17 and impart the rotational motion thereof to takeup reel 13. Of course, other means for driving supply reel 12 and takeup reel 13 can be used without departing from the invention as defined in the appended claims. Generally, recorded on tape 20 is a plurality of identical programs. A tape hub 19 is secured over supply spindle 16 to hold it in place during rotation.

Still referring to FIG. 1, tape 20 has a first end 21 which is threaded past a plurality of guide rollers 25 and into cooperation with information detection means 24 such as a linear counter or an audio monitoring device. Detection means 24 aids in determining when a predetermined length of tape has passed therethrough. Thus, in this exemplary embodiment an operator can use detection means 24 to tell when a completed program from supply reel 12 has been wound onto takeup reel 13. For example, if each program on supply reel 12 is a predetermined length of 1000 inches, the operator can begin to stop the rotation of reels 12 and 13 when detection means 24 approaches 1000. Moreover, as explained hereinafter, since tape winding system 10 can reach a speed of about 700 inches per second, the entire winding operation of each program from supply reel 12 takes only a few seconds.

Figure 2:
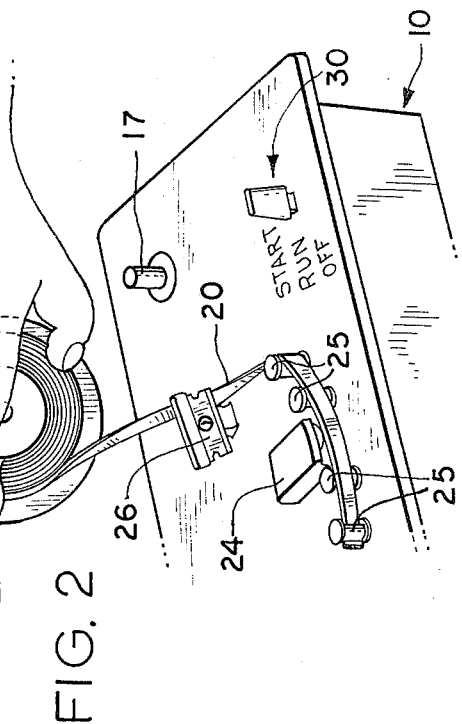
FIG. 2 is an enlarged schematic view of a portion of the tape winding system shown in FIG. 1 illustrating the cutting of tape on the takeup reel.

First end 21 of tape 20, after being threaded past detection means 24 and guide rollers 25, is initially wound around takeup reel 13 for preferably 1½ starting turns. It should be observed, however, that end 21 should not be buried under successive turns of tape 20, but should extend above takeup reel 13, and thus be accessible for subsequent pullout and splicing. Blade means, such as a single-edge razor blade 26, are spaced from takeup reel 13 to facilitate the cutting of tape 29 after a complete program has been wound from supply reel 12 to takeup reel 13. The manner in which blade 26 cuts tape 20 is shown in FIG. 2.

Figure 3:
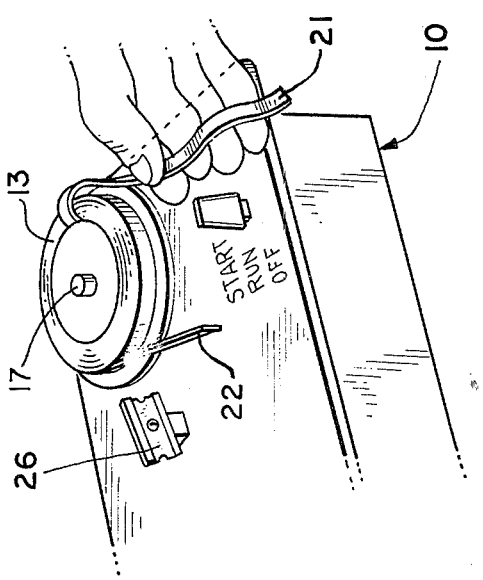
FIG. 3 is an enlarged, schematic view of a portion of the tape winding system shown in FIG. 1, illustrating the splicing of tape on the takeup reel.

The cutting of tape 20 defines a second or outer end 22 shown in FIG. 3. After cutting, the tape wound on takeup reel 13 is then ready for splicing and insertion into a magazine to form the completed 8-track cartridge. More particularly, as illustrated in FIG. 3, first end 21, sometimes referred to herein as an interior end because of its original placement close to the hub of takeup reel 13, is pulled out until a substantial leader section is obtained. Since, as explained in greater detail hereinafter, tape 20 is wound on takeup reel 13 with a loose center, minimal crinkle and wastage will result during pullout. Ends 21 and 22 are then spliced together to form a continuous loop of tape.

Figure 4:
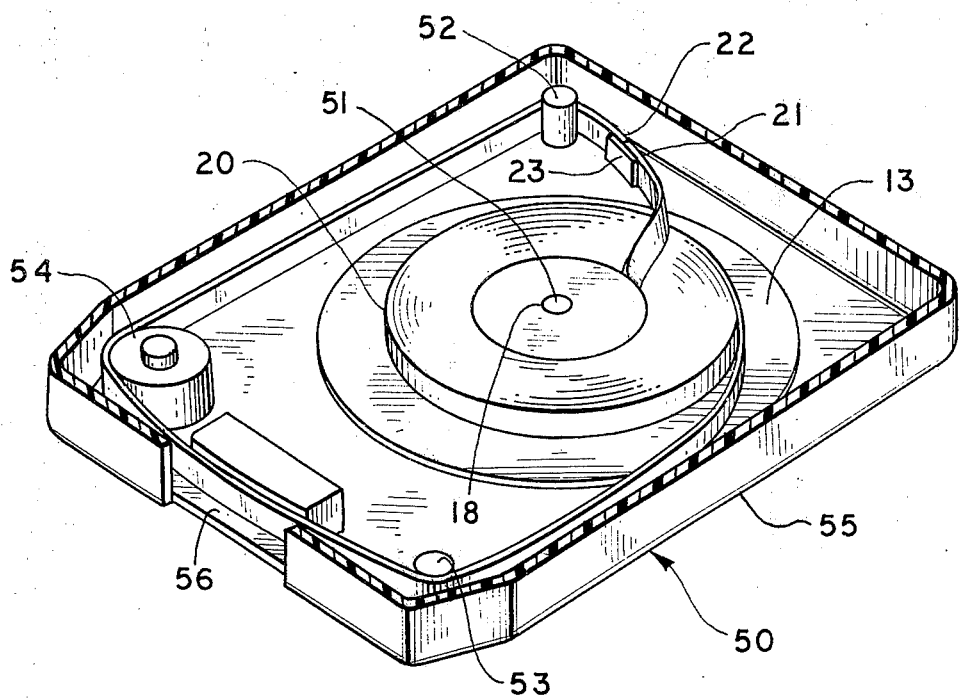
FIG. 4 is a schematic, perspective view of a completed 8-track cartridge.

As shown in FIG. 4, takeup reel 13, with ends 21 and 22 connected to form a splice 23, is then inserted in a magazine 55 to form an 8-track cartridge 50. More particularly, magazine 55 has a center post 51 which fits through center aperture means 18 in takeup reel 13 for seating takeup reel 13 in magazine 55. A length of tape 20 from takeup reel 13 is then wound around a plurality of guide posts 52 and a pinch roller 54. Pinch roller 54 conventionally cooperates with drive means associated with a cartridge playback machine (not shown) to drive tape 20 about the continuous loop created as a result of splice 23. When so driven, tape 20 is fed past an access 56 which is aligned with playback means (not shown) associated with the playback machine. These playback means cause the program material recorded on tape 20 to be reproduced in a well-known manner.

Figure 5:
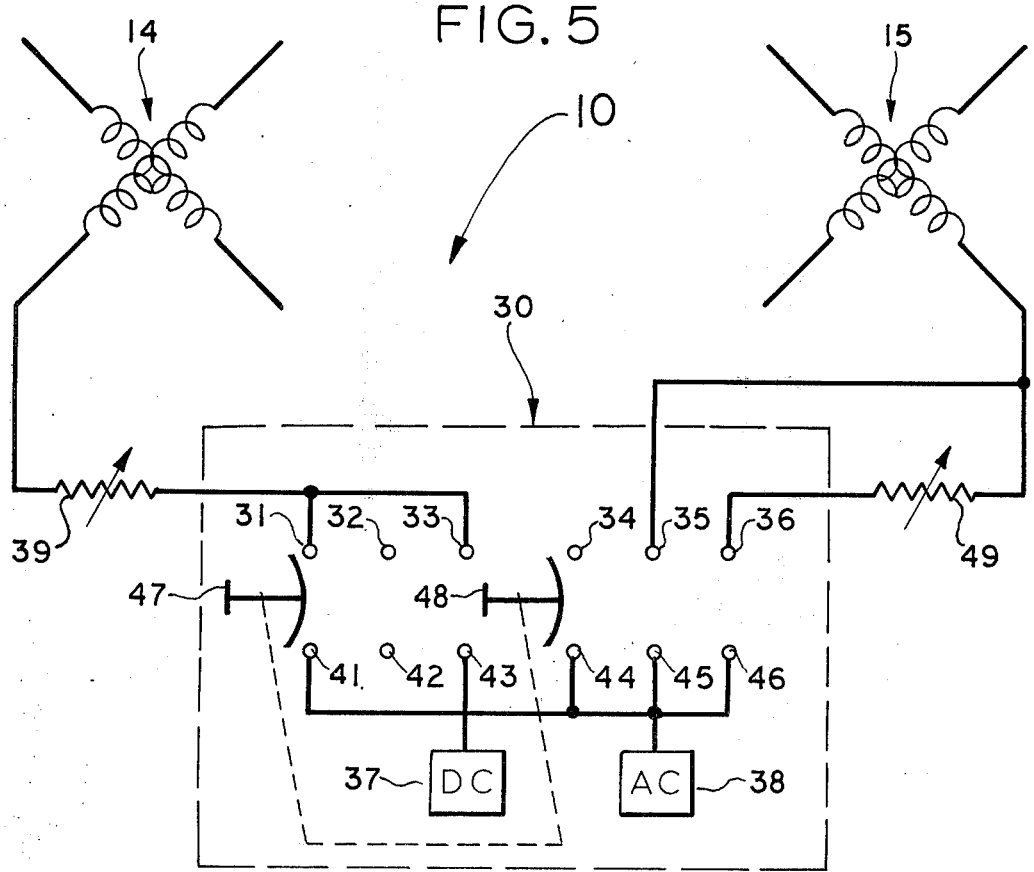
FIG. 5 is a simplified circuit diagram illustrating the basic circuit elements of the tape winding system shown in FIG. 1.

Referring now to FIG. 5, a simplified circuit diagram of the circuit elements associated with tape winding system 10 is shown. More particularly, mode means 30, having supply start terminals 31, 41, supply run terminals 32, 42 and supply stop terminals 33, 43 are shown. Mode means 30 also includes takeup start terminals 34, 44, takeup run terminals 35, 45 and takeup stop terminals 36, 46.

A contact 47 is adapted to alternatively connect supply start terminals 31, 41, supply run terminals 32, 42 and supply stop terminals 33, 43. Similarly, a contact 48 is adapted to alternatively connect takeup start terminals 34, 44, takeup run terminals 35, 45 and takeup stop terminals 36, 46. As illustrated by the dashed line in FIG. 5, contacts 47 and 48 are mechanically coupled, whereby the movement of contact 47 across supply start terminals 31, 41, for example, causes contact 48 to move across takeup start terminals 34, 44. Supply start terminals 31, 41 and takeup start terminals 34, 44 comprise start means for mode means 30. Similarly, supply run terminals 32, 42 and takeup run terminals 35, 45 comprise run means, and supply stop terminals 33, 43 and takeup stop terminals 36, 46 comprise stop means.

Mode means 30 further include AC means 38 for providing a source of electric current, and DC means 37. AC means 38 are coupled jointly to supply start terminal 41, takeup start terminal 44, takeup run terminal 45 and takeup stop terminal 46. In this embodiment DC means 37 are coupled only to supply stop terminal 43. Supply stop terminal 33 is connected to supply motor 14 to provide DC directly thereto at the appropriate time.

Still referring to FIG. 5, a variable resistor 39 is coupled between supply motor 14 and supply start terminal 31. Another variable resistor 49, adapted to limit the electric current passed to takeup motor 15, is coupled between takeup motor 15 and takeup start terminal 34. Terminal 35 is also connected to takeup motor 15, bypassing variable resistor 49. Finally, DC means 37 of mode means 30 are connected to supply stop terminal 43, and AC means 38 are jointed coupled to terminals 41, 42, 44, 45 and 46.

Remembering the explanation in connection with FIG. 1, wherein it is shown how a few starting turns of tape from the supply reel were initially wound on the takeup reel, the operation of tape winding system 10 can now be described. The operator begins by causing contacts 47 and 48 to be simultaneously moved across terminals 31, 41 and 34, 44, respectively. This action causes electric current to pass from AC means 38 through terminals 41, 31 and resistor 39 to supply motor 14. Motor 14 causes the supply reel to rotate, thereby causing tape to unwind therefrom. Simultaneously, electric current passes from AC means 38, through terminals 44, 34 to takeup motor 15, via resistor 49. Takeup motor 15 causes the takeup reel to rotate, whereupon the tape unwound from the supply reel begins to wind onto the takeup reel. Since the linear speed at which tape is unwound from the supply reel is substantially equal to the linear speed at which tape is being wound onto the takeup reel, at least during this initial "start" period, there will be minimal tension on the tape. Accordingly, the few turns of tape during this period will not be tightly wound onto the takeup reel, thereby achieving the loose center needed for substantially crinkle-free pullout. These turns are sometimes referred to herein as center winds, and the remaining turns sometimes referred to herein as noncenter winds.

The current from AC means 38 is limited by resistor 39, and therefore supply motor 14 will accelerate as fast as it otherwise may. On the other hand, the current from AC means 38 passes through resistor 49 enroute to takeup motor 15 and therefore the takeup motor approaches synchronous speed at a rate complementary to supply motor 14. Even though the angular speed of motor 15 exceeds that of motor 14 during this start period, the supply reel, because of its larger effective diameter, will soon begin to unwind tape faster than the takeup reel can wind it up. This will occur even after several tape programs have been unwound from the supply reel, thereby reducing the effective diameter of the supply reel, since the decrease in diameter is substantially compensated by a corresponding reduction in weight due to the unwinding of tape. Before any tape spillage can occur, however, the operator will cause contacts 47 and 48 to be moved across run terminals 32, 42 and 35, 45, respectively. When this occurs, current from AC means 38 continues to energize takeup motor 15, by bypassing resistor 49. However, the current to supply motor 14 is blocked by the open circuit at terminal 32. As a result, motor 14 is deenergized and the supply reel becomes freewheeling, i.e., it is turned solely by the pulling force from the tape still being wound on the takeup reel. In another aspect of this exemplary embodiment, however, a small amount of current is continuously applied to supply motor 14 during this run period to overcome the frictional and inertial forces associated with the rotation of the supply reel.

During the run period, takeup reel 13 reaches its synchronous speed of 3600 rpm, whereby tape winding system 10 approaches its maximum linear tape speed of 700 inches per second. It should be noted that as long as takeup reel 13 pulls tape during this run period air entrapment is minimized and relatively tight, noncenter winds result. Accordingly, a complete program from the supply reel having loose center winds and tight noncenter winds is very rapidly wound on the takeup reel. When the end of this program approaches, the operator will cause contacts 47 and 48 to be moved across stop terminals 33, 43 and 36, 46, respectively. This action causes DC to be applied through contacts 43, 33 bypassing resistor 39 to supply motor 14, causing the rapid deceleration and stopping thereof. Accordingly, the drag due to the application of DC on supply motor 14 causes motors 14 and 15 to decelerate to a stop.

Though the preferred embodiment of the tape winding system depicted in FIG. 1 does not show a capstan or a capstan motor, it should be clear that the same can be incorporated without departing from the true scope of the invention. More particularly, a capstan motor can be used to forwardly drive supply reel 12, thereby pulling tape therefrom at approximately the same linear speed at which the tape is being wound on takeup reel 13. As a result, during the initial start period, minimal tension is applied to the tape. Thereafter, during the run period, the tape is more tightly wound on takeup reel 13 by changing the mode of operation in a manner similar to that described hereinbefore. When a capstan motor is used, however, it is still desirable to utilize a third motor to provide drag to the supply reel 12. Thus, though the invention can be practiced with a capstan motor, the embodiment depicted by FIG. 1 is preferred because a third motor can be avoided. The result is a wound quantity of tape having loose center winds and tight noncenter winds. Thereafter, the tape is cut and spliced, and along with the takeup reel, is inserted into a magazine in a manner explained hereinbefore.

In view of the foregoing, it will be apparent to those skilled in the art that many modifications, refinements and improvements which do not part from the true scope of the invention can be envisioned and made. The appended claims are intended to cover all such modifications, refinements and improvements.

I claim:

1. In a tape winding system having supply means driven by supply driving means, and takeup means driven by takeup driving means said supply driving means and said takeup driving means comprising the sole drive for said supply means and said takeup means, a method for winding a quantity of tape from said supply means to said takeup means, comprising the following steps:
    a. forwardly energizing said supply driving means and said takeup driving means causing tape to unwind from said supply means and wind onto said takeup means with minimal tension on said tape; then
    b. reducing the energization of said supply driving means causing tape to be pulled from said supply means onto said takeup means; and then
    c. stopping said supply means and said takeup means.
2. The method recited in claim 1 wherein said supply driving means in Step b is only partially de-energized to offset inertial and frictional forces associated with the rotation of said supply reel.
3. The method recited in claim 1 further includes the step of winding a portion of said tape from said supply means to said takeup means prior to Step a.
4. The method recited in claim 1 wherein said supply driving means are coupled directly to said supply means.

5. A method for fabricating a tape cartridge by winding a quantity of tape from a supply reel to a takeup reel utilizing a tape winding system having supply reel driving means for driving said supply means and a takeup winding system for driving said takeup reel, comprising the following steps:
    a. forwardly energizing said supply drivng means causing tape to unwind from said supply reel; then
    b. energizing said takeup driving means causing tape to wind onto said takeup reel at substantially the same rate as said tape is unwound from said supply reel, thereby placing minimal tension on said tape; then
    c. reducing the energization of said supply driving means causing tape to be pulled from said supply reel onto said takeup reel; then
    d. stopping said supply reel and said takeup reel; then
    e. cutting said tape at a point between said supply reel and said takeup reel; and then
    f. splicing together the ends of the quantity of tape wound on said takeup reel.
6. The method recited in claim 5 wherein said supply driving means in Step c is only partially de-energized to offset inertial and frictional forces associated with the rotation of said supply reel.
7. The method recited in claim 5 further includes the step of winding a portion of said tape from said supply reel to said takeup reel prior to Step a.
8. The method recited in claim 7 further includes the step of inserting said takeup reel into a magazine.
9. The method recited in claim 5 wherein Steps a and b occur simultaneously.
10. A tape winding system comprising:
    takeup drive means and supply drive means;
    takeup means drivable by said takeup drive means, and supply means drivable by said supply drive means;
    AC means for producing an electric current;
    mode means having start means for simultaneously coupling said electric current to said supply drive means and to said takeup drive means; said mode means further having run means for simultaneously reducing said electric current passed to said supply drive means, and increasing said electric current to said takeup drive means.
11. the tape winding system recited in claim 10 wherein said supply drive means and said takeup drive means are motors.
12. The tape winding system recited in claim 11 further includes DC means, and said mode means further includes stop means for coupling said DC means to said supply drive means to provide drag on said takeup means to stop said takeup means.
13. The tape winding system recited in claim 10 further includes current limiting means secured between said mode means and said takeup drive means.
14. The tape winding system recited in claim 10 wherein said takeup means include a takeup reel for receiving tape from said supply means.
15. The tape winding system recited in claim 14 further includes blade means, spaced from said takeup reel, to cut said tape after it is received by said takeup reel.

* * * * *